United States Patent
Golding et al.

(10) Patent No.: US 12,491,147 B2
(45) Date of Patent: Dec. 9, 2025

(54) PERSONAL CARE COMPOSITIONS COMPRISING A METAL PIROCTONE COMPLEX

(71) Applicant: Conopco, Inc., Englewood Cliffs, NJ (US)

(72) Inventors: Stephen Golding, Northwich (GB); James Merrington, Wirral (GB); Ian Geoffrey Wood, Chester (GB); Wei Zhao, Shanghai (CN)

(73) Assignee: Conopco, Inc., Englewood Cliff, NJ (US)

( * ) Notice: Subject to any disclaimer, the term of this patent is extended or adjusted under 35 U.S.C. 154(b) by 624 days.

(21) Appl. No.: 17/923,733

(22) PCT Filed: Apr. 29, 2021

(86) PCT No.: PCT/EP2021/061346
§ 371 (c)(1),
(2) Date: Nov. 7, 2022

(87) PCT Pub. No.: WO2021/224118
PCT Pub. Date: Nov. 11, 2021

(65) Prior Publication Data
US 2023/0190611 A1 Jun. 22, 2023

(30) Foreign Application Priority Data

| May 8, 2020 | (WO) | PCT/CN2020/089262 |
| Jun. 4, 2020 | (EP) | 20178170 |
| Feb. 26, 2021 | (WO) | PCT/CN2021/078255 |

(51) Int. Cl.
| *A61K 8/58* | (2006.01) |
| *A61G 5/00* | (2006.01) |
| *A61K 8/49* | (2006.01) |
| *A61K 8/73* | (2006.01) |
| *A61Q 5/00* | (2006.01) |
| *A61Q 5/02* | (2006.01) |

(52) U.S. Cl.
CPC ........... *A61K 8/58* (2013.01); *A61G 5/006* (2013.01); *A61K 8/4926* (2013.01); *A61K 8/737* (2013.01); *A61Q 5/02* (2013.01); *A61K 2800/596* (2013.01)

(58) Field of Classification Search
None
See application file for complete search history.

(56) References Cited

U.S. PATENT DOCUMENTS

| 3,958,581 A | 5/1976 | Abegg et al. |
| 3,962,418 A | 6/1976 | Birkofer |
| 4,009,256 A | 2/1977 | Nowak, Jr. et al. |
| 5,194,639 A | 3/1993 | Connor et al. |
| 2002/0037299 A1 | 3/2002 | Turowski-Wanke et al. |
| 2016/0310393 A1 | 10/2016 | Chang et al. |
| 2017/0105919 A1 | 4/2017 | Iwata |
| 2019/0328647 A1 | 10/2019 | Chang et al. |

FOREIGN PATENT DOCUMENTS

| EP | 0386900 | 9/1990 |
| EP | 1108420 | 6/2001 |
| EP | 3421093 | 1/2019 |
| EP | 3695825 | 8/2020 |
| JP | H0454113 | 2/1992 |
| WO | WO9206154 | 4/1992 |
| WO | WO9522311 | 8/1995 |
| WO | WO2013138973 | 9/2013 |
| WO | WO2020229199 | 11/2020 |

OTHER PUBLICATIONS

Search Report and Written Opinion in EP20178170; Oct. 9, 2020; European Patent Office (EPO).
Search report and Written Opinion in PCTEP2021061346; Jul. 9, 2021; World Intellectual Property Org. (WIPO).
IPRP2 in PCTEP2021061346; Aug. 5, 2020; World Intellectual Property Org. (WIPO).
Taking care of your customers' hair; Clariant; 2015; 16 pages (XP055319009).
Zhang Taijun et al., Research and application of pyrithione type anti-dandruff hair care product, Guangdong Mingchen Co. Ltd., Jan. 3, 2014.
Yang Xiaoshan et al., Summary of anti-dandruff and antipruritic piroctone ethanolamine salt, Guangdong Chemical Industry, Apr. 30, 2020.

*Primary Examiner* — Noble E Jarrell
(74) *Attorney, Agent, or Firm* — Byrne Poh LLP; Nina R. Horan

(57) ABSTRACT

A personal care composition comprising a surfactant-insoluble piroctone complex and a surfactant.

17 Claims, No Drawings

PERSONAL CARE COMPOSITIONS COMPRISING A METAL PIROCTONE COMPLEX

CROSS-REFERENCE TO RELATED APPLICATION

The present application is a U.S. National Phase Application under 35 U.S.C. § 371 of International Application No. PCT/EP2021/061346 filed on Apr. 29, 2021, which claims priority to International Application No. PCT/CN2020/089262 filed on May 8, 2020, European patent application No. 20178170.5 filed on Jun. 4, 2020, and International Application No. PCT/CN2021/078255 filed on Feb. 26, 2021, the contents of all of which are hereby incorporated herein by reference in their entireties for all purposes.

TECHNICAL FIELD

This invention relates to a personal care composition comprising a piroctone complex, in particular hair care compositions.

BACKGROUND

Dandruff is a problem affecting many globally. The condition is manifested by the shedding of clumps of dead skin cells from the scalp. These are white in colour and provide an aesthetically displeasing appearance. A factor that contributes to dandruff are certain members of the *Malassezia* yeasts. To combat these, hair treatment compositions are developed including various actives for their antidandruff effectiveness. Piroctone compound such as piroctone olamine is one such active.

A common problem with piroctone compound is that deposition of the active onto the desired surface during wash process is minimum. The desired surface is typically scalp and/or hair. For example, piroctone compound such as piroctone olamine is usually soluble in surfactants of the cleansing phase comprised in a hair treatment composition. During the excessive rinsing process, the majority of piroctone is likely to be washed away together with the surfactants. Poor deposition is correlated with low antidandruff activity, thus little mitigation of the ill-effects of dandruff. To date, there are attempts to offset this drawback by increasing the level of piroctone olamine in hair treatment composition. Such approach causes a variety of issues such as increased costs, potential instability of the formulation and potential adverse effect to hair sensory. Hence it is not an approach favoured by the industry.

There remains a need to improve the deposition of piroctone compounds, especially piroctone acid or piroctone olamine, onto the surface of scalp and/or hair during washing process. There also remains a further need to improve the UV stability of compositions comprising piroctone of piroctoneolamine based antidandruff agents.

The present invention relates to personal care compositions, particularly hair treatment compositions with good UV stability and deposition of an octopirox compound.

DESCRIPTION OF THE INVENTION

According to the present invention there is provided a personal care composition comprising a surfactant and a metal piroctone complex, the metal piroctone complex having a solubility of 2 wt % or less in a 5 wt % SLES1EO aqueous surfactant solution at 20° C.

The invention also relates to the use of a surfactant-insoluble piroctone complex in a hair treatment composition for preventing UV degradation of the piroctone compound.

A further aspect of the invention relates to a non-therapeutic method for treating hair or the scalp, comprising application of a personal care as described above.

DETAILED DESCRIPTION OF THE INVENTION

Except in the examples, or where otherwise explicitly indicated, all numbers in this description indicating amounts of material or conditions of reaction, physical properties of materials and/or use may optionally be understood as modified by the word "about".

All amounts are by weight of the composition, unless otherwise specified.

It should be noted that in specifying any ranges of values, any upper value can be associated with any particular lower value.

Where a feature is disclosed with respect to a particular aspect of the invention (for example a composition of the invention), such disclosure is also to be considered to apply to any other aspect of the invention (for example a method of the invention) mutatis mutandis.

Any ingredients mentioned in this application that are natural or naturally derived have been sourced from Europe.

The composition of the present invention comprises a personal care composition comprising a surfactant-insoluble piroctone complex and a surfactant. In the context of the present application a surfactant-insoluble piroctone complex is a complex having a solubility in a 5 wt % SLES1EO aqueous surfactant solution at 20° C. of 2 wt % or less.

The Piroctone Complex

The surfactant-insoluble piroctone complex is preferably an insoluble metal piroctone complex, more preferably a manganese piroctone complex or a copper piroctone complex, in particular copper bis-piroctone and/or a manganese bis-piroctone and/or a manganese tris-piroctone. Of particular interest is copper bis-piroctone and/or a manganese tris-piroctone with copper bis-piroctone being the most preferred.

Preferably the surfactant-insoluble piroctone complex is prepared by the reaction of Octopirox (piroctone olamine) with a metal salt, more preferably by the following steps: dissolution of Octopirox (piroctone olamine) in a suitable solvent, dissolution of a metal salt in a suitable solvent followed by combining the two solutions is such a manner that a metal piroctone complex is formed.

Preferably the metal salt used to form the insoluble metal piroctone complex is a metal chloride.

The piroctone complex may be formed prior to its addition to the remainder of the composition or in-situ within the composition.

Preferably, the piroctone complex is present at from 0.01 to 2 wt % of the total composition, more preferably from 0.05 to 1 wt % and most preferably from 0.1 to 0.8 wt % of the composition.

The Surfactant System

The composition may be in any common personal product form, especially that used as a hair care product. Preferably, it is a rinse off composition and most preferably, it is an anti-dandruff shampoo composition.

The composition may comprise any of the ingredients commonly found in personal care products, especially hair care products depending on the product form.

For example, when the composition is a shampoo it will comprise a surfactant system including at least one cleansing surfactant suitable for use in shampoos. When it is a composition which aims to provide conditioning benefit, it will comprise a conditioning active. Suitable conditioning actives include fatty alcohols, silicones and cationic surfactants.

Examples of suitable anionic cleansing surfactants are the alkyl sulphates, alkyl ether sulfates, alkaryl sulfonates, alkanoyl isethionates, alkyl succinates, alkyl sulfosuccinates, alkyl ether sulfosuccinates, N-alkyl sarcosinates, alkyl phosphates, alkyl ether phosphates, and alkyl ether carboxylic acids and salts thereof, especially their sodium, magnesium, ammonium and mono-, di- and triethanolamine salts. The alkyl and acyl groups generally contain from 8 to 18, preferably from 10 to 16 carbon atoms and may be unsaturated. The alkyl ether sulfates, alkyl ether sulfosuccinates, alkyl ether phosphates and alkyl ether carboxylic acids and salts thereof may contain from 1 to 20 ethylene oxide or propylene oxide units per molecule.

Typical anionic cleansing surfactants for use in compositions of the invention include sodium oleyl succinate, ammonium lauryl sulfosuccinate, sodium lauryl sulfate, sodium lauryl ether sulphate, sodium lauryl ether sulphosuccinate, ammonium lauryl sulfate, ammonium lauryl ether sulfate, sodium dodecylbenzene sulfonate, triethanolamine dodecylbenzene sulfonate, sodium cocoyl isethionate, sodium lauryl isethionate, lauryl ether carboxylic acid and sodium N-lauryl sarcosinate.

Preferred anionic surfactants are the alkyl sulfates and alkyl ether sulfates. These materials have the respective formulae $ROSO_3M$ and $R—O(C_2H_4O)_xSO_3M$, wherein R is alkyl or alkenyl of from 8 to 18 carbon atoms, x is an integer having a value of from about 1 to about 10, and M is a cation such as ammonium, alkanolamines, such as triethanolamine, monovalent metals, such as sodium and potassium, and polyvalent metal cations, such as magnesium, and calcium. Most preferably, R has 12 to 14 carbon atoms, in a linear rather than branched chain.

Preferred anionic cleansing surfactants are selected from sodium lauryl sulfate and sodium lauryl ether sulfate(n)EO, (where n is from 1 to 3); more preferably sodium lauryl ether sulfate(n)EO, (where n is from 1 to 3); most preferably sodium lauryl ether sulfate1EO.

Preferably the level of alkyl ether sulfate is from 0.5 wt % to 25 wt % of the total composition, more preferably from 3 wt % to 18 wt %, most preferably from 6 wt % to 15 wt % of the total composition.

The total amount of anionic cleansing surfactant in compositions of the invention generally ranges from 0.5 wt % to 45 wt %, more preferably from 1.5 wt % to 20 wt %.

Compositions of the invention may contain non-ionic surfactant. Most preferably, non-ionic surfactants are present in the range 0 to 5 wt %.

Non-ionic surfactants that can be included in compositions of the invention include condensation products of aliphatic ($C_8-C_{18}$) primary or secondary linear or branched chain alcohols or phenols with alkylene oxides, usually ethylene oxide and generally having from 6 to 30 ethylene oxide groups. Alkyl ethoxylates are particularly preferred. Most preferred are alkyl ethoxylates having the formula $R—(OCH_2CH_2)_nOH$, where R is a $C_{12-15}$ alkyl chain and n is 5 to 9.

Other suitable non-ionic surfactants include mono- or di-alkyl alkanolamides. Examples include coco mono- or di-ethanolamide and coco mono-isopropanolamide.

Further non-ionic surfactants which can be included in shampoo compositions of the invention are the alkyl polyglycosides (APGs). Typically, APG is one which comprises an alkyl group connected (optionally via a bridging group) to a block of one or more glycosyl groups. Preferred APGs are defined by the following formula:

$$RO-(G)_n$$

wherein R is a branched or straight chain alkyl group which may be saturated or unsaturated and G is a saccharide group. R may represent an alkyl chain with a mean length of from about $C_5$ to about $C_{20}$. Most preferably R represents an alkyl chain with a mean length of from about $C_{9.5}$ to about $C_{10.5}$. G may be selected from C5 or C6 monosaccharide residues, and is preferably a glucoside. G may be selected from the group comprising glucose, xylose, lactose, fructose, mannose and derivatives thereof. Preferably G is glucose.

The degree of polymerisation, n, may have a value of from about 1 to about 10 or more. Preferably, the value of n lies from about 1.1 to about 2. Most preferably the value of n lies from about 1.3 to about 1.5.

Suitable alkyl polyglycosides for use in the invention are commercially available and include for example those materials identified as: Oramix NS10 ex Seppic; Plantaren 1200 and Plantaren 2000 ex BASF (DeWolf).

Other sugar-derived non-ionic surfactants which can be included in compositions of the invention include the $C_{10}$-$C_{18}$ N-alkyl ($C_1$-$C_6$) polyhydroxy fatty acid amides, such as the $C_{12}$-$C_{18}$ N-methyl glucamides, as described for example in WO 92 06154 and U.S. Pat. No. 5,194,639, and the N-alkoxy polyhydroxy fatty acid amides, such as C10-C18 N-(3-methoxypropyl) glucamide.

Amphoteric or zwitterionic surfactant can be included in an amount ranging from 0.5 wt % to about 8 wt %, preferably from 1 wt % to 4 wt % of the total shampoo composition.

Examples of amphoteric or zwitterionic surfactants include alkyl amine oxides, alkyl betaines, alkyl amidopropyl betaines, alkyl sulfobetaines (sultaines), alkyl glycinates, alkyl carboxyglycinates, alkyl amphoacetates, alkyl amphopropionates, alkylamphoglycinates, alkyl amidopropyl hydroxysultaines, acyl taurates and acyl glutamates, wherein the alkyl and acyl groups have from 8 to 19 carbon atoms. Typical amphoteric and zwitterionic surfactants for use in shampoos of the invention include lauryl amine oxide, cocodimethyl sulfopropyl betaine, lauryl betaine, cocamidopropyl betaine and sodium cocoamphoacetate.

A particularly preferred amphoteric or zwitterionic surfactant is cocamidopropyl betaine. Mixtures of any of the foregoing amphoteric or zwitterionic surfactants may also be suitable. Preferred mixtures are those of cocamidopropyl betaine with further amphoteric or zwitterionic surfactants as described above. A preferred further amphoteric or zwitterionic surfactant is sodium cocoamphoacetate.

Particularly preferred compositions comprise a surfactant system comprising: 10 to 20 wt % of the composition sodium lauryl sulphate or sodium lauryl ether sulphate (n) EO, (where n ranges from 1 to 3); 0.5 to 5 wt % of the composition cocamidopropylbetaine; and 0.5 to 5 wt % of the composition sodium cocoamphoacetate or sodium lauryl cocoamphoacetate.

Other Ingredients

The Compositions May Also Include One or More of the Following Non-Essential Ingredients:

pH Adjusters

The pH of the compositions is preferably in the range of from 5 to 8, more preferably in the range of from 6 to 7 e.g., 6.5. The pH of the compositions can be adjusted using alkaline agents (such as sodium hydroxide, for example) or acidic agents (such as citric acid) as is well-known in the art.

Cationic Polymer

A cationic polymer is a preferred ingredient in the hair care compositions according to the invention, for enhancing performance of the compositions.

The cationic polymer may be a homopolymer or be formed from two or more types of monomers. The molecular weight of the polymer will generally be between 5 000 and 10 000 000, typically at least 10 000 and preferably in the range 100 000 to about 2 000 000. The polymers will have cationic nitrogen containing groups such as quaternary ammonium or protonated amino groups, or a mixture thereof.

The cationic nitrogen-containing group will generally be present as a substituent on a fraction of the total monomer units of the cationic polymer. Thus, when the polymer is not a homopolymer it can contain spacer non-cationic monomer units. Such polymers are described in the CTFA Cosmetic Ingredient Directory, 3rd edition. The ratio of the cationic to non-cationic monomer units is selected to give a polymer having a cationic charge density in the required range.

Suitable cationic conditioning polymers include, for example, copolymers of vinyl monomers having cationic amine or quaternary ammonium functionalities with water soluble spacer monomers such as (meth)acrylamide, alkyl and dialkyl (meth)acrylamides, alkyl (meth)acrylate, vinyl caprolactone and vinyl pyrrolidine. The alkyl and dialkyl substituted monomers preferably have C1-C7 alkyl groups, more preferably C1-3 alkyl groups. Other suitable spacers include vinyl esters, vinyl alcohol, maleic anhydride, propylene glycol and ethylene glycol.

The cationic amines can be primary, secondary or tertiary amines, depending upon the particular species and the pH of the composition. In general secondary and tertiary amines, especially tertiary, are preferred.

Amine substituted vinyl monomers and amines can be polymerized in the amine form and then converted to ammonium by quaternization.

The cationic conditioning polymers can comprise mixtures of monomer units derived from amine—and/or quaternary ammonium-substituted monomer and/or compatible spacer monomers.

Suitable cationic conditioning polymers include, for example:

a) copolymers of 1-vinyl-2-pyrrolidine and 1-vinyl-3-methyl-imidazolium salt (e.g. chloride salt), referred to in the industry by the Cosmetic, Toiletry, and Fragrance Association, (CTFA) as Polyquaternium-16. This material is commercially available from BASF Wyandotte Corp. (Parsippany, NJ, USA) under the LUVIQUAT tradename (e.g. LUVIQUAT FC 370);

b) copolymers of 1-vinyl-2-pyrrolidine and dimethylaminoethyl methacrylate, referred to in the industry (CTFA) as Polyquaternium-11. This material is available commercially from Gaf Corporation (Wayne, NJ, USA) under the GAFQUAT tradename (e.g., GAFQUAT 755N);

c) cationic diallyl quaternary ammonium-containing polymers including, for example, dimethyldiallyammonium chloride homopolymer and copolymers of acrylamide and dimethyldiallylammonium chloride, referred to in the industry (CTFA) as Polyquaternium 6 and Polyquaternium 7, respectively;

d) mineral acid salts of amino-alkyl esters of homo- and co-polymers of unsaturated carboxylic acids having from 3 to 5 carbon atoms, (as described in U.S. Pat. No. 4,009,256);

e) cationic polyacrylamides (as described in WO95/22311).

Preferred cationic conditioning polymers that can be used include cationic polysaccharide polymers, such as cationic cellulose derivatives, cationic starch derivatives, and cationic guar gum derivatives. Suitably, such cationic polysaccharide polymers have a charge density in the range from 0.1 to 4 meq/g.

Cationic polysaccharide polymers suitable for use in compositions of the invention include those of the formula:

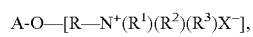

$$A-O-[R-N^+(R^1)(R^2)(R^3)X^-],$$

wherein: A is an anhydroglucose residual group, such as a starch or cellulose anhydroglucose residual. R is an alkylene, oxyalkylene, polyoxyalkylene, or hydroxyalkylene group, or combination thereof. $R^1$, $R^2$ and $R^3$ independently represent alkyl, aryl, alkylaryl, arylalkyl, alkoxyalkyl, or alkoxyaryl groups, each group containing up to about 18 carbon atoms. The total number of carbon atoms for each cationic moiety (i.e., the sum of carbon atoms in $R^1$, $R^2$ and $R^3$) is preferably about 20 or less, and X is an anionic counterion.

Cationic cellulose is available from Amerchol Corp. (Edison, NJ, USA) in their Polymer JR (trade mark) and LR (trade mark) series of polymers, as salts of hydroxyethyl cellulose reacted with trimethyl ammonium substituted epoxide, referred to in the industry (CTFA) as Polyquaternium 10. Another type of cationic cellulose includes the polymeric quaternary ammonium salts of hydroxyethyl cellulose reacted with lauryl dimethyl ammonium-substituted epoxide, referred to in the industry (CTFA) as Polyquaternium 24. These materials are available from Amerchol Corp. (Edison, NJ, USA) under the tradename Polymer LM-200.

Other suitable cationic polysaccharide polymers include quaternary nitrogen-containing cellulose ethers (e.g. as described in U.S. Pat. No. 3,962,418), and copolymers of etherified cellulose and starch (e.g. as described in U.S. Pat. No. 3,958,581).

A particularly suitable type of cationic polysaccharide polymer that can be used is a cationic guar gum derivative, such as guar hydroxypropyltrimonium chloride (commercially available from Rhone-Poulenc in their JAGUAR trademark series).

Examples are JAGUAR C13S, which has a low degree of substitution of the cationic groups and high viscosity. JAGUAR C15, having a moderate degree of substitution and a low viscosity, JAGUAR C17 (high degree of substitution, high viscosity), JAGUAR C16, which is a hydroxypropylated cationic guar derivative containing a low level of substituent groups as well as cationic quaternary ammonium groups, and JAGUAR 162 which is a high transparency, medium viscosity guar having a low degree of substitution.

Preferably the cationic conditioning polymer is selected from cationic cellulose and cationic guar derivatives. Particularly preferred cationic polymers are JAGUAR C13S, JAGUAR C15, JAGUAR C17 and JAGUAR C16 and JAGUAR C162. Particularly preferred is guar hydroxpropyltrimonium chloride.

The cationic conditioning polymer will generally be present in compositions of the invention at levels of from 0.01 to 5, preferably from 0.05 to 1, more preferably from 0.08 to 0.5 wt % of the composition.

When cationic conditioning polymer is present in a hair care composition according to the invention, it is preferred if the copolymer is present as emulsion particles with a mean diameter ($D_{3,2}$ as measured by light scattering using a Malvern particle sizer) of 2 micrometres or less.

Hair care compositions of the invention are preferably aqueous, i.e. they have water or an aqueous solution or a lyotropic liquid crystalline phase as their major component. Suitably, the composition will comprise from 50 to 98 wt %, preferably from 60 to 90 wt % water based on the total weight of the composition.

Silicone

The anti-dandruff hair compositions may additional comprise from 0.1 to 10 wt %, preferably from 0.1 to about 8 wt %, more preferably from about 0.3 to about 5 wt % of a silicone.

Preferred suitable silicones may include polyalkyl siloxanes, polyaryl siloxanes, polyalkylaryl siloxanes, polyether siloxane copolymers, amino silicones and mixtures thereof.

The silicone may be present as the free silicone oil, or in the form of a silicone emulsion.

Preferably the silicone is present in the form of a silicone emulsion, more preferably an aqueous surfactant stabilized emulsion of silicone particles having a number average particle diameter ranging from 10 to 1,000 nm, most preferably from about 100 to about 500 nm.

Amino silicones are often formulated in hair compositions. Amino silicones are silicones containing at least one primary amine, secondary amine, tertiary amine or a quaternary ammonium group. High molecular weight silicone gums can also be utilized. Another useful type are the crosslinked silicone elastomers such as Dimethicone/Vinyl/Dimethicone Crosspolymers (e.g. Dow Corning 9040 and 9041).

Examples of suitable pre-formed silicone emulsions include emulsions DC2-1766, DC2-1784, DC-1785, DC-1786, DC-1788 and microemulsions DC2-1865 and DC2-1870, all available from Dow Corning. These are all emulsions or microemulsions of dimethiconol. Also suitable are amodimethicone emulsions such as DC939 (from Dow Corning) and SME253 (from GE Silicones).

Suspending Agent

Preferably, the hair care composition of the invention further comprises a suspending agent. Suitable suspending agents are selected from polyacrylic acids, cross-linked polymers of acrylic acid, copolymers of acrylic acid with a hydrophobic monomer, copolymers of carboxylic acid-containing monomers and acrylic esters, cross-linked copolymers of acrylic acid and acrylate esters, heteropolysaccharide gums and crystalline long chain acyl derivatives. The long chain acyl derivative is desirably selected from ethylene glycol stearate, alkanolamides of fatty acids having from 16 to 22 carbon atoms and mixtures thereof. Ethylene glycol distearate and polyethylene glycol 3 distearate are preferred long chain acyl derivatives, since these impart pearlescence to the composition. Polyacrylic acid is available commercially as Carbopol 420, Carbopol 488 or Carbopol 493. Polymers of acrylic acid cross-linked with a polyfunctional agent may also be used; they are available commercially as Carbopol 910, Carbopol 934, Carbopol 941 and Carbopol 980. An example of a suitable copolymer of a carboxylic acid containing monomer and acrylic acid esters is Carbopol 1342. All Carbopol (trademark) materials are available from Goodrich.

Suitable cross-linked polymers of acrylic acid and acrylate esters are Pemulen TR1 or Pemulen TR2. A suitable heteropolysaccharide gum is xanthan gum, for example that available as Kelzan mu.

Mixtures of any of the above suspending agents may be used. Preferred is a mixture of cross-linked polymer of acrylic acid and crystalline long chain acyl derivative.

Suspending agent, if included, will generally be present in a hair care composition of the invention at levels of from 0.1 to 10 wt %, preferably from 0.5 to 6 wt %, more preferably from 0.9 to 4 wt % based on the total weight of the composition.

Non-Silicone Oily Conditioning Components

Compositions according to the present invention may also comprise a dispersed, non-volatile, water-insoluble oily conditioning agent.

This component will be dispersed in the composition in the form of droplets, which form a separate, discontinuous phase from the aqueous, continuous phase of the composition. In other words, the oily conditioning agent will be present in the shampoo composition in the form of an oil-in-water emulsion.

By "insoluble" is meant that the material is not soluble in water (distilled or equivalent) at a concentration of 0.1 percent (w/w), at 25° C. Suitably, the D [3, 2] average droplet size of the oily conditioning component is at least 0.4, preferably at least 0.8, and more preferably at least 1 micro m. Additionally, the D [3,2] average droplet size of the oily conditioning component is preferably no greater than 10, more preferably no greater 8, more preferably no greater than 5, yet more preferably no greater than 4, and most preferably no greater than 3.5 μm.

The oily conditioning agent may suitably be selected from oily or fatty materials, and mixtures thereof.

Oily or fatty materials are preferred conditioning agents in the shampoo compositions of the invention for adding shine to the hair and also enhancing dry combing and dry hair feel.

Preferred oily and fatty materials will generally have a viscosity of less than 5 Pa·s, more preferably less than 1 Pa·s, and most preferably less than 0.5 Pa·s, e.g. 0.1 Pa·s and under as measured at 25 degrees centigrade with a Brookfield Viscometer (e.g. Brookfield RV) using spindle 3 operating at 100 rpm.

Oily and fatty materials with higher viscosities may be used. For example, materials with viscosities as high as 65 Pa·s may be used. The viscosity of such materials (i.e. materials with viscosities of 5 Pa·s and greater) can be measured by means of a glass capillary viscometer as set out further in Dow Corning Corporate Test Method CTM004, Jul. 20, 1970.

Suitable oily or fatty materials are selected from hydrocarbon oils, fatty esters and mixtures thereof.

Hydrocarbon oils include cyclic hydrocarbons, straight chain aliphatic hydrocarbons (saturated or unsaturated), and branched chain aliphatic hydrocarbons (saturated or unsaturated). Straight chain hydrocarbon oils will preferably contain from about 12 to about 30 carbon atoms. Branched chain hydrocarbon oils can and typically may contain higher numbers of carbon atoms. Also suitable are polymeric hydrocarbons of alkenyl monomers, such as C2 to C6 alkenyl monomers. These polymers can be straight or branched chain polymers. The straight chain polymers will typically be relatively short in length, having a total number of carbon atoms as described above for straight chain hydrocarbons in general. The branched chain polymers can have substantially higher chain length. The number average molecular weight of such materials can vary widely, but will typically be up to about 2000, preferably from about 200 to about 1000, more preferably from about 300 to about 600.

Specific examples of suitable hydrocarbon oils include paraffin oil, mineral oil, saturated and unsaturated dodecane, saturated and unsaturated tridecane, saturated and unsaturated tetradecane, saturated and unsaturated pentadecane, saturated and unsaturated hexadecane, and mixtures thereof. Branched-chain isomers of these compounds, as well as of higher chain length hydrocarbons, can also be used. Exemplary branched-chain isomers are highly branched saturated or unsaturated alkanes, such as the permethyl-substituted isomers, e.g., the permethyl-substituted isomers of hexadecane and eicosane, such as 2, 2, 4, 4, 6, 6, 8, 8-dimethyl-10-methylundecane and 2, 2, 4, 4, 6, 6-dimethyl-8-methyl-nonane, sold by Permethyl Corporation. A further example of a hydrocarbon polymer is polybutene, such as the copolymer of isobutylene and butene. A commercially available material of this type is L-14 polybutene from Amoco Chemical Co. (Chicago, Ill., U.S.A.).

Particularly preferred hydrocarbon oils are the various grades of mineral oils. Mineral oils are clear oily liquids obtained from petroleum oil, from which waxes have been removed, and the more volatile fractions removed by distillation. The fraction distilling between 250 degrees centigrade to 300 degrees centigrade is termed mineral oil, and it consists of a mixture of hydrocarbons ranging from $C16H34$ to $C21H 4$. Suitable commercially available materials of this type include Sirius M85 and Sirius M125, all available from Silkolene.

Suitable fatty esters are characterised by having at least 10 carbon atoms, and include esters with hydrocarbyl chains derived from fatty acids or alcohols, e.g., monocarboxylic acid esters, polyhydric alcohol esters, and di- and tricarboxylic acid esters. The hydrocarbyl radicals of the fatty esters hereof can also include or have covalently bonded thereto other compatible functionalities, such as amides and alkoxy moieties, such as ethoxy or ether linkages. Monocarboxylic acid esters include esters of alcohols and/or acids of the formula R'COOR in which R' and R independently denote alkyl or alkenyl radicals and the sum of carbon atoms in R' and R is at least 10, preferably at least 20.

Specific examples include, for example, alkyl and alkenyl esters of fatty acids having aliphatic chains with from about 10 to about 22 carbon atoms, and alkyl and/or alkenyl fatty alcohol carboxylic acid esters having an alkyl and/or alkenyl alcohol-derived aliphatic chain with about 10 to about 22 carbon atoms, benzoate esters of fatty alcohols having from about 12 to 20 carbon atoms.

The monocarboxylic acid ester need not necessarily contain at least one chain with at least 10 carbon atoms, so long as the total number of aliphatic chain carbon atoms is at least 10. Examples include isopropyl isostearate, hexyl laurate, isohexyl laurate, isohexyl palmitate, isopropyl palmitate, decyl oleate, isodecyl oleate, hexadecyl stearate, decyl stearate, isopropyl isostearate, dihexyldecyl adipate, lauryl lactate, myristyl lactate, cetyl lactate, oleyl stearate, oleyl oleate, oleyl myristate, lauryl acetate, cetyl propionate, and oleyl adipate. Di- and trialkyl and alkenyl esters of carboxylic acids can also be used. These include, for example, esters of C4 to C8 dicarboxylic acids such as C7 to C22 esters (preferably C1 to C9) of succinic acid, glutaric acid, adipic acid, hexanoic acid, heptanoic acid, and octanoic acid. Examples include diisopropyl adipate, diisohexyl adipate, and diisopropyl sebacate. Other specific examples include isocetyl stearoyl stearate, and tristearyl citrate.

Polyhydric alcohol esters include alkylene glycol esters, for example ethylene glycol mono and di-fatty acid esters, diethylene glycol mono- and di-fatty acid esters, polyethylene glycol mono- and di-fatty acid esters, propylene glycol mono- and di-fatty acid esters, polypropylene glycol monooleate, polypropylene glycol monostearate, ethoxylated propylene glycol monostearate, polyglycerol polyfatty acid esters, ethoxylated glyceryl monostearate, 1,3-butylene glycol monostearate, 1,3-butylene glycol distearate, polyoxyethylene polyol fatty add ester, sorbitan fatty acid esters, polyoxyethylene sorbitan fatty acid esters and mono-, di- and triglycerides.

Particularly preferred fatty esters are mono-, di- and triglycerides, more specifically the mono-, di-, and tri-esters of glycerol and long chain carboxylic acids such as C7 to C22 carboxylic acids. A variety of these types of materials can be obtained from vegetable and animal fats and oils, such as coconut oil, castor oil, safflower oil, sunflower oil, cottonseed oil, corn oil, olive oil, cod liver oil, almond oil, avocado oil, palm oil, sesame oil, peanut oil, lanolin and soybean oil. Synthetic oils include triolein and tristearin glyceryl dilaurate.

Specific examples of preferred materials include cocoa butter, palm stearin, sunflower oil, soyabean oil and coconut oil. The oily or fatty material is suitably present at a level of from 0.05 to 10, preferably from 0.2 to 5, more preferably from about 0.5 to 3 wt %.

The compositions of this invention preferably contain no more than 3 wt % of a styling polymer, more preferably less than 1 percent of a styling polymer, preferably contain less than 0.1 wt % styling polymer, and optimally are free of styling polymer.

In hair treatment compositions containing a conditioning agent, it is preferred that a cationic polymer also be present.

Adjuvants

The compositions of the present invention may also contain adjuvants suitable for hair care. Generally such ingredients are included individually at a level of up to 2, preferably up to 1 wt % of the total composition.

Among suitable hair care adjuvants, are:

(i) natural hair root nutrients, such as amino acids and sugars. Examples of suitable amino acids include arginine, cysteine, glutamine, glutamic acid, isoleucine, leucine, methionine, serine and valine, and/or precursors and derivatives thereof. The amino acids may be added singly, in mixtures, or in the form of peptides, e.g. di- and tripeptides. The amino acids may also be added in the form of a protein hydrolysate, such as a keratin or collagen hydrolysate. Suitable sugars are glucose, dextrose and fructose. These may be added singly or in the form of, e.g. fruit extracts. A particularly preferred combination of natural hair root nutrients for inclusion in compositions of the invention is isoleucine and glucose. A particularly preferred amino acid nutrient is arginine.

(ii) hair fibre benefit agents. Examples are: ceramides, for moisturising the fibre and maintaining cuticle integrity. Ceramides are available by extraction from natural sources, or as synthetic ceramides and pseudoceramides. A preferred ceramide is Ceramide II, ex Quest. Mixtures of ceramides may also be suitable, such as Ceramides LS, ex Laboratoires Serobiologiques.

Minor Ingredients

The compositions may also include other ingredients for enhancing performance and/or consumer acceptability. Such ingredients include fragrance (encapsulated or free or both), colorants, dyes and pigments, pearlescers or opacifiers, viscosity modifiers, stabilisers and preservatives. A suitable preservative system comprises Sodium Benzoate and Sodium Salicylate with pH adjustment using Sodium hydroxide and Citric Acid $H_2O$. An alternative preservation system comprising formaldehyde comprises: MIT and DMDM Hydantoin.

Product Forms

The compositions are preferably personal care compositions, more preferably shampoos, conditioners, sprays, mousses, gels, waxes or lotions. Particularly preferred product forms are shampoos, post-wash conditioners (leave-in and rinse-off) and hair treatment products such as hair essences. Rinse off products are preferred and shampoos are particularly preferred.

The compositions are preferably formulated as compositions for the treatment of hair and subsequent rinsing.

A particularly preferred hair care composition is a shampoo composition. The total amount of surfactant in shampoo compositions of the invention (including any co-surfactant, and/or any emulsifier) is generally from 5 to 30 wt %, preferably from 10 to 25 wt %, more preferably from 15 to 20 wt % of the composition.

Method of Use

Compositions of the invention can be used in medical or non-medical products,

A preferred method of use is application to the hair and scalp, preferably followed by rinsing the product from the hair with water. The product preferably remains on the hair for a period of about 2 minutes to about 10 minutes.

The invention will now be further described with reference to the following non-limiting examples. Examples according to the invention are illustrated by a number, comparative Examples by a letter.

EXAMPLES

Preparation of metal-piroctone complexes

Example 1 Copper Piroctone

Under stirring, 0.03 mol of $CuCl_2 \cdot 4H_2O$ dissolved in water is added into it dropwise.

Demin water added to the precipitation of the viscous solids.

The suspensions are stirred for 2-4 hours at the room temperature.

The separated white solids are washed, dried over $P_2O_5$ for 24 hours at the temperature of 50° C. under vacuum.

Example 2 Manganese Piroctone 0.04 mol of Octopirox dissolved in ethanol.

Under stirring, 0.03 mol of $MnCl_2 \cdot 4H_2O$ dissolved in water is added into it dropwise.

Demin water added to the precipitation of the viscous solids.

The suspensions are stirred for 2-4 hours at the room temperature.

The separated white solids are washed, dried over P2O5 for 24 hours at the temperature of 50° C. under vacuum.

Example a Zinc Piroctone 0.04 mol of Octopirox dissolved in ethanol.

Under stirring, 0.03 mol of ZnCl2 dissolved in water is added into it dropwise.

Demin water added to the precipitation of the viscous solids.

The suspensions are stirred for 2-4 hours at the room temperature.

The separated white solids are washed, dried over P2O5 for 24 hours at the temperature of 50° C. under vacuum.

Example 5 Copper Piroctone Prepared During Shampoo Formulation

An aqueous mixture of sodium lauryl ether sulpfate 1EO, cocamidopropyl betaine and guar hydroxpropyltrimonium chloride was prepared.

Sodium salicylate dissolved in water was added to this mixture followed by phenoxyethanol The pH was adjusted to pH 6, using Citric Acid (50 wt-%).

Viscosity was adjusted using Sodium Chloride,

Octopirox is slowly added to the formulation followed by an aqueous solution of copper chloride Further water was added.

Solubility of Metal Piroctone Complexes

The Solubility of Metal Piroctone Complexes at 20° C. In a 5 wt % Aqueous Solution of SLES 1EO (Sodium Lauryl Ether Sulfate) is Listed in Table 1:

TABLE 1

| Sample | % Solubility |
| --- | --- |
| 1% OCT | 100.2 |
| 1% Cu-PIR | 1.3 |
| 1% Mn-PIR | 1.0 |
| 1% Zn-PIR | 111.8 |

Shampoo Composition

The following shampoo compositions were prepared.

TABLE 2

| Example formulation | 3 | 4 | 5 | B | C |
| --- | --- | --- | --- | --- | --- |
| Sodium lauryl ether sulfate 1EO, wt-% | 13 | 13 | 13 | 13 | 13 |
| Cocamidopropyl betaine, wt-% | 1 | 1 | 1 | 1 | 1 |
| Sodium chloride, wt-% | 1.2 | 1.2 | 1.2 | 1.2 | 1.2 |
| Guar hydroxypropyltrimonium chloride, wt-% | 0.2 | 0.2 | 0.2 | 0.2 | 0.2 |
| Sodium salicyclate, wt-% | 0.3 | 0.3 | 0.3 | 0.3 | 0.3 |
| Phenoxyethanol, wt-% | 0.5 | 0.5 | 0.5 | 0.5 | 0.5 |
| Citric acid, wt-% | 0.03 | 0.03 | 0.03 | 0.03 | 0.03 |
| pH | 6 | 6 | 6 | 6 | 6 |
| Octopirox, wt-% | 0 | 0 | 0.75 | 0 | 0.75 |
| Copper bis-piroctone, wt-% | 0.6 | 0 | 0 | 0 | 0 |
| Manganese bis-piroctone, wt-% | 0 | 0.6 | 0 | 0 | 0 |
| Copper chloride, wt-% | 0 | 0 | 0.25 | 0 | 0 |
| Zinc bis-piroctone, wt-% | 0 | 0 | 0 | 0.66 | 0 |
| Water, wt-% | To 100% | To 100% | To 100% | To 100% | To 100% |

Metal Piroctone Complex Solubility in Shampoo.
Solubility, as determined visually.

TABLE 3

| Example formulation | 3 | 4 | 5 | B | C |
|---|---|---|---|---|---|
| Appearance | opaque | opaque | opaque | clear | clear |

In-Vitro Deposition Experiment to Hair Substrate.
HPLC-UV Method
- Agilent 1100 HPLC System
- Agilent Eclipse plus C18 100×4.6; 3.5 um column
- 30° C. column-oven temperature, 1.5 ml/min, 302 nm 10 nm ref=360/50 nm pressure ~75 bar, Isocratic mobile phase: Acetonitrile/MeOH/Water (KH2PO4 20 mM; EDTA (0.5 mM) )(65:13:22), adjusted to pH 4 with phosphoric acid Hair Switch Washing Protocol:

All hair switches were all pre-treated by washing with a 14 wt-% SLES solution to standardise them. Hair switches were subsequently treated using a wash process under standard conditions with the relevant Octopirox or metal-piroctone complex-containing shampoo base. The protocol was applied to 3 switches for each composition.

Once dried, hair switches were each treated with ethanol to extract Octopirox or complex. The extracts were analysed by HPLC-UV and the concentration of piroctone calculated.

Piroctone-Complex Deposition Results

TABLE 4

| Example formulation | 3 (Cu) | B(Zn) | C (OCT) |
|---|---|---|---|
| Piroctone concentration, ug/mL | 41.38 | 1.44 | 2.74 |
| Piroctone concentration standard deviation, ug/mL | 5.23 | 0.03 | 0.42 |

The results demonstrate the Examples of the invention has enhanced deposition of piroctone on the hair.

Examples 5, 6 and D

The UV stability of an ethanolic solutions (0.5 mM) of copper piroctone and manganese piroctone were measured and compared with a solution of Octopirox 1 mM solution.

After 5 hours of UV irradiation (UVA 180 uW/cm2, UVB210 uW/cm2) it was found that manganese piroctone had degraded by 3.2%, copper piroctone 1.8% and Octopirox (piroctone) 46%

These results demonstrate the improved UV stability of the metal piroctone complexes.

The invention claimed is:

1. A personal care composition comprising a surfactant and a metal piroctone complex, wherein the metal piroctone complex has a solubility of 2 wt % or less in a 5 wt % aqueous SLES1EO surfactant solution at 20° C.

2. The personal care composition of claim 1, wherein the insoluble piroctone complex is a manganese piroctone complex or a copper piroctone complex.

3. The personal care composition of claim 1, wherein the insoluble piroctone complex is copper bis-piroctone and/or a manganese bis-piroctone.

4. The personal care composition of claim 1, wherein the surfactant is a cleansing surfactant.

5. The personal care composition of claim 4, wherein the cleansing surfactant is an anionic surfactant.

6. The personal care composition of claim 4, further comprising an amphoteric surfactant.

7. The personal care composition of claim 1, further comprising a cationic polymer.

8. The personal care composition of claim 7, wherein the cationic polymer is a cationic guar derivative.

9. The personal care composition of claim 1, further comprising a silicone.

10. The personal care composition of claim 1, wherein the personal care composition comprises from 0.01 to 2 wt % of the total composition of piroctone complex.

11. The personal care composition of claim 1, wherein the personal care composition is a shampoo.

12. A non-therapeutic method of treating hair or the scalp, comprising application of a personal care composition of claim 1 to the hair or scalp.

13. The non-therapeutic method of claim 12, wherein the composition is washed off after use.

14. A method for preventing UV degradation of piroctone compound in a hair treatment composition, comprising using a surfactant-insoluble piroctone complex in the hair treatment composition.

15. The personal care composition of claim 4, wherein the cleansing surfactant is an ethoxylated anionic surfactant.

16. The personal care composition of claim 1, wherein the personal care composition comprises from 0.05 to 1 wt % of the total composition of piroctone complex.

17. The personal care composition of claim 1, wherein the personal care composition comprises from 0.1 to 0.8 wt % of the total composition of piroctone complex.

* * * * *